(12) United States Patent
Koenig et al.

(10) Patent No.: US 11,512,736 B2
(45) Date of Patent: Nov. 29, 2022

(54) BEARING UNIT FOR A TURBOCHARGER ROTOR

(71) Applicant: BorgWarner Inc., Auburn Hills, MI (US)

(72) Inventors: Lothar Koenig, Schmalenberg (DE); Oliver Schumnig, Gundersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 146 days.

(21) Appl. No.: 16/652,577

(22) PCT Filed: Oct. 9, 2018

(86) PCT No.: PCT/US2018/055031
§ 371 (c)(1),
(2) Date: Mar. 31, 2020

(87) PCT Pub. No.: WO2019/074936
PCT Pub. Date: Apr. 18, 2019

(65) Prior Publication Data
US 2020/0232503 A1 Jul. 23, 2020

(30) Foreign Application Priority Data
Oct. 10, 2017 (DE) .......................... 102017217999.6

(51) Int. Cl.
*F01D 25/16* (2006.01)
*F16C 17/18* (2006.01)
*F16C 17/02* (2006.01)

(52) U.S. Cl.
CPC .............. *F16C 17/18* (2013.01); *F01D 25/16* (2013.01); *F16C 17/02* (2013.01)

(58) Field of Classification Search
None
See application file for complete search history.

(56) References Cited

U.S. PATENT DOCUMENTS 3,090,546 A * 5/1963 Woollenweber, Jr. ... F16J 15/54
  415/111
8,845,271 B2 * 9/2014 Woollenweber ........ F01D 25/16
  415/107

(Continued)

FOREIGN PATENT DOCUMENTS

CN  104 975 889 B  7/2017
DE  102013208247 A1  11/2014

(Continued)

OTHER PUBLICATIONS

International Search Report of the International Searching Authority for PCT/US2018/055031 dated Jan. 3, 2019.

(Continued)

*Primary Examiner* — Kayla Mccaffrey
(74) *Attorney, Agent, or Firm* — Howard & Howard Attorneys PLLC

(57) ABSTRACT

The invention relates to a bearing unit for a turbocharger rotor. The bearing unit comprises a bearing housing and a bearing bush which is arranged in a central bore for radially mounting a turbocharger rotor in the bearing housing. In the region of a first axial end, the bearing bush has a radially outwardly extending projection. The projection is designed to interact with the bearing housing as an anti-rotation safeguard for the bearing bush.

15 Claims, 5 Drawing Sheets

(56) References Cited

U.S. PATENT DOCUMENTS

| | | | | |
|---|---|---|---|---|
| 9,494,047 | B2* | 11/2016 | Schumnig | F01D 25/164 |
| 9,528,389 | B2* | 12/2016 | Koerner | F16C 27/02 |
| 2013/0236336 | A1 | 9/2013 | Koerner et al. | |

FOREIGN PATENT DOCUMENTS

| | | |
|---|---|---|
| DE | 102014211945 A1 | 10/2015 |
| GB | 935 457 A | 8/1963 |
| WO | 2012/064575 A2 | 5/2012 |

OTHER PUBLICATIONS

Machine-assisted English language abstract and machine-assisted English language translation for DE 10 2013 208 247 A1 extracted from espacenet.com database on Jun. 21, 2022, 10 pages.

Machine-assisted English language abstract and machine-assisted English language translation for DE 10 2014 211 945 A1 extracted from espacenet.com database on Jun. 21, 2022, 9 pages.

\* cited by examiner

BEARING UNIT FOR A TURBOCHARGER ROTOR

CROSS-REFERENCE TO RELATED APPLICATIONS

The present application is the National Stage of International Patent Application No. PCT/US2018/055031, filed on Oct. 9, 2018, which claims priority to and all the benefits of German Application No. 102017217999.6, filed on Oct. 10, 2017, which are hereby expressly incorporated herein by reference in their entirety.

FIELD OF THE INVENTION

The present invention relates to a bearing unit for a turbocharger rotor, and to a supercharging apparatus having a corresponding bearing unit.

BACKGROUND OF THE INVENTION

Vehicles of the newer generation are increasingly being equipped with supercharging apparatuses, in order to achieve the requirement targets and legal requirements. In the case of the development of supercharging apparatuses, the aim is to optimize both the individual components and the system as an entirety with regard to their reliability and efficiency.

For example, exhaust gas turbochargers are known, in the case of which a turbine is driven by the exhaust gas stream of the internal combustion engine by way of a turbine wheel. A compressor impeller which is arranged on a common rotor with the turbine wheel compresses the fresh air which is sucked in for the engine. As a result, the air or oxygen quantity which is available to the engine for combustion is increased, which in turn leads to a performance increase of the internal combustion engine.

Known supercharging apparatuses comprise at least one compressor housing with the compressor impeller which is arranged therein, and a bearing housing, in which the rotor is mounted. For radial mounting, for example, the rotor can be arranged in a bearing bush which is in turn positioned in a bore in the bearing housing. In order to avoid a corotation of the bearing bush with the rotor, securing means are provided which prevent a rotation of the bearing bush with respect to the bearing housing. Known securing means are, for example, rigid securing plates, screwed-in securing bolts or securing rings.

In addition to the disadvantage that additional parts have to be mounted, all of these solutions require, owing to the system, high accuracy during the production and/or increased installation space. The additional parts increase the complexity of the bearing unit, the susceptibility to faults during assembly, and the costs for the bearing unit. The increased installation space requirement necessitates a greater overhang of the compressor impeller in relation to the radial mounting of the rotor, which has a disadvantageous effect on the dynamics of the rotor (rotor dynamics).

Accordingly, it is an aim of the present invention to provide a compact and inexpensive bearing unit for a turbocharger rotor by way of improved fixing of the bearing bush.

SUMMARY OF THE INVENTION

The present invention relates to a bearing unit as claimed in claim 1 and a supercharging apparatus as claimed in claim 13.

The bearing unit according to the invention for a turbocharger rotor comprises a bearing housing and a bearing bush which is arranged in a central bore for radially mounting a turbocharger rotor in the bearing housing. In the region of a first axial end, the bearing bush has a radially outwardly extending projection. The projection is designed to interact with the bearing housing as an anti-rotation safeguard for the bearing bush. The configuration according to the invention of the bearing unit has the advantage that no additional components are required for the anti-rotation safeguard of the bearing bush in the bearing housing, but rather only a modification of the existing components, in this case the bearing bush, is necessary. By implication, this also means very rapid and simple assembly of the bearing unit, since no further components have to be assembled. Since no additional securing elements which usually have to be manufactured with high precision and are therefore expensive to produce have to be produced and assembled, the costs for the production of the bearing unit are also reduced. Although the anti-rotation safeguard is configured integrally with the bearing bush, there is no loss of functional faces in the bearing unit. Furthermore, the radially extending projection of the bearing bush has the advantage that it serves at the same time as a quality assurance element in accordance with the poka-yoke system, since faulty assembly of the bearing bush is as it were impossible as a result of the asymmetrical configuration. Moreover, the bearing unit according to the invention has a very compact overall design, since no additional space has to be provided for securing elements. Therefore, the axial extent of the bearing unit is shorter relative to the bearing units which are known from the prior art.

In refinements, the projection can be configured, for example, as a cam.

In refinements which can be combined with all refinements which have been described up to now, a cutout can be provided in a radial side wall of the bearing housing, which cutout interacts with the projection, in order to prevent a rotation of the bearing bush. The depth of the cutout can correspond to at least half of the axial extent of the projection. The depth of the cutout can be at least as great as the axial extent of the projection. The depth of the cutout can be greater than the axial extent of the projection. The depth of the cutout can be from 1.1 to 3 times, in particular from 1.5 to 2.5 times, particularly preferably from 1.8 to 2.2 times greater than the axial extent of the projection.

In refinements which can be combined with all refinements which have been described up to now, moreover, the projection can serve for axially securing the bearing bush. The projection for axially securing the bearing bush can interact with a housing cover or a torque-proof component of an axial bearing of the turbocharger rotor. An axially extending pin can be arranged on the housing cover or the torque-proof component of the axial bearing, which pin interacts with the projection for axially securing the bearing bush. As an alternative, an axially extending pin can be arranged in the region of a radial end of the projection, which pin interacts with the housing cover or the torque-proof component of the axial bearing for axially securing the bearing bush. The bearing arrangement according to the invention therefore not only has the advantage that the projection of the bearing bush serves as an anti-rotation safeguard for the bearing bush, but rather also that the projection at the same time serves as a means for axially securing the bearing bush in the bearing housing. The axially extending pin on the torque-proof component of the axial bearing or the housing cover or the projection ensures that a certain spacing is guaranteed in the axial direction between the bearing bush and the rotating components of the axial bearing, and no contact occurs between the bearing bush and the rotating components of the axial bearing.

In refinements which can be combined with all refinements which have been described up to now, the bearing bush can be machined from solid material.

Moreover, the invention comprises a supercharging apparatus for an internal combustion engine having a compressor with a compressor housing and a compressor impeller which is arranged therein, and having a bearing unit according to any one of the preceding refinements.

In refinements, the supercharging apparatus can be an exhaust gas turbocharger and, moreover, can comprise a turbine with a turbine housing and a turbine wheel which is arranged therein.

Further details and features of the invention will be described in the following text using the figures.

DETAILED DESCRIPTION

In the following text, exemplary embodiments for the bearing unit 10 according to the invention will be described using the figures. Within the context of this application, radial faces/side faces relate to faces which lie in planes which are arranged orthogonally with respect to the longitudinal axis/rotational axis 500 of the turbocharger rotor 200.

Figure 1:
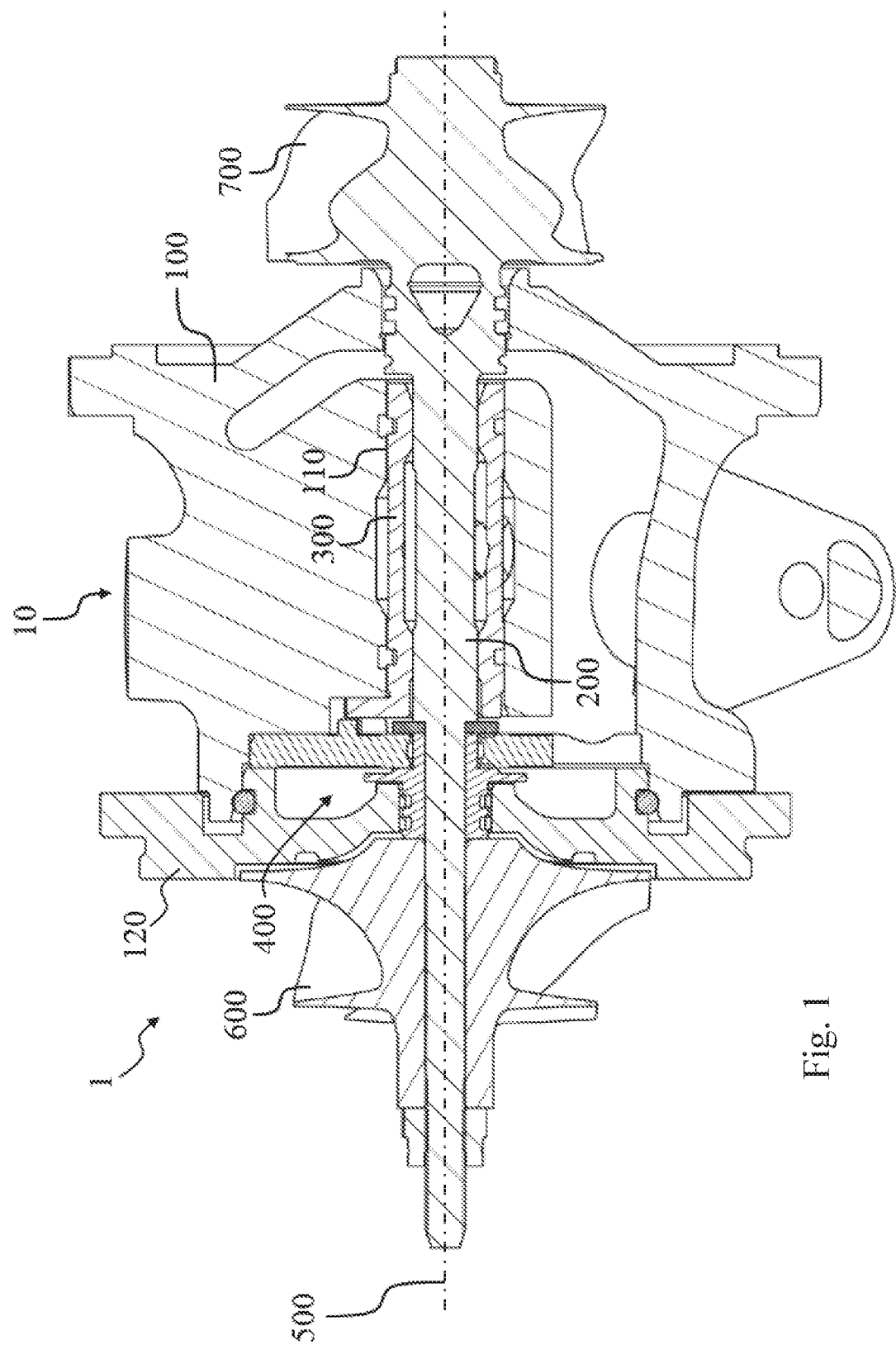
FIG. 1 shows a sectional view of one exemplary embodiment of the bearing unit according to the invention in a part of a supercharging apparatus according to the invention.
Figure 2:
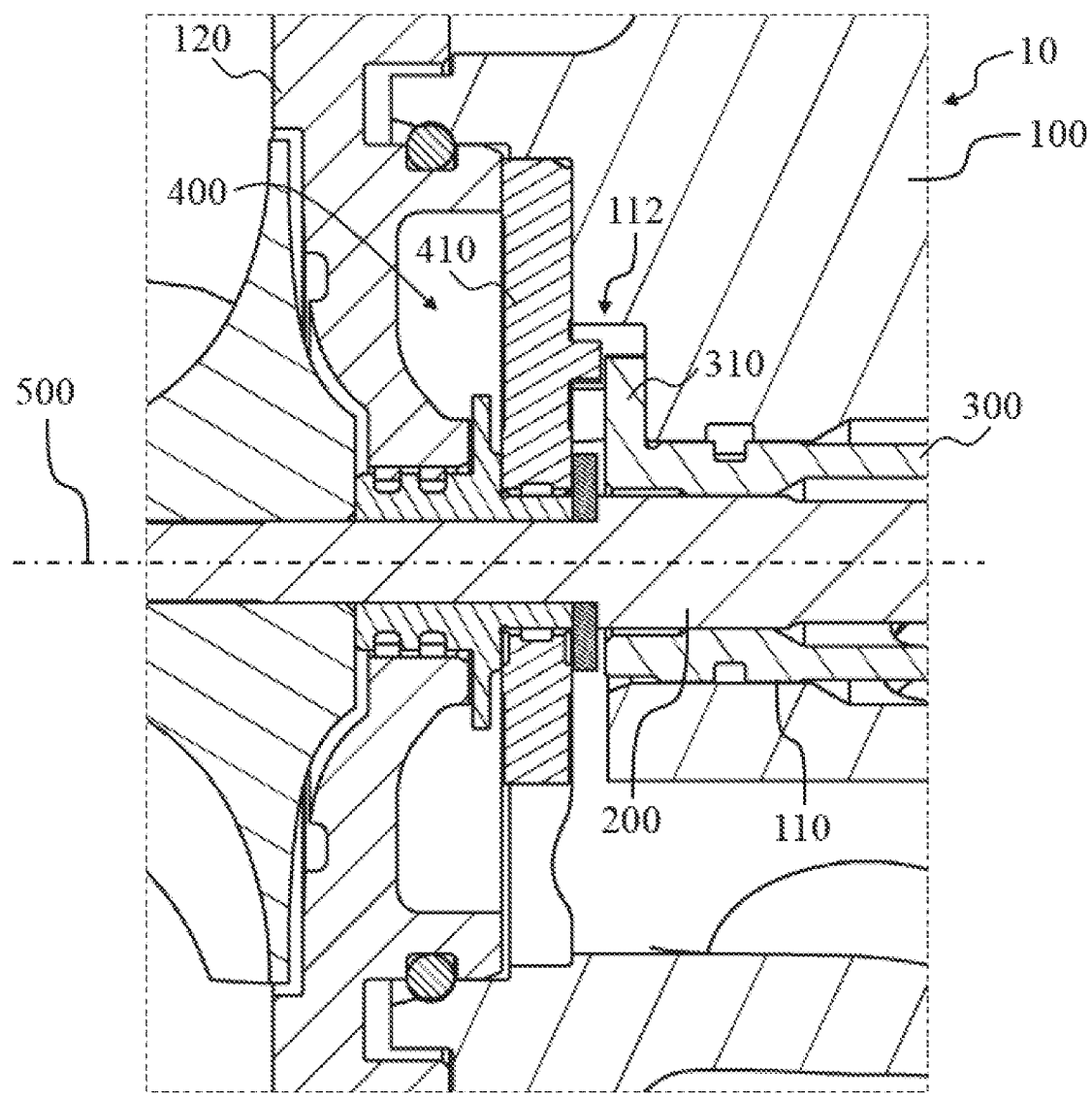
FIG. 2 shows a sectional view of an enlarged detail of the bearing unit according to the invention from FIG. 1.
Figure 3:
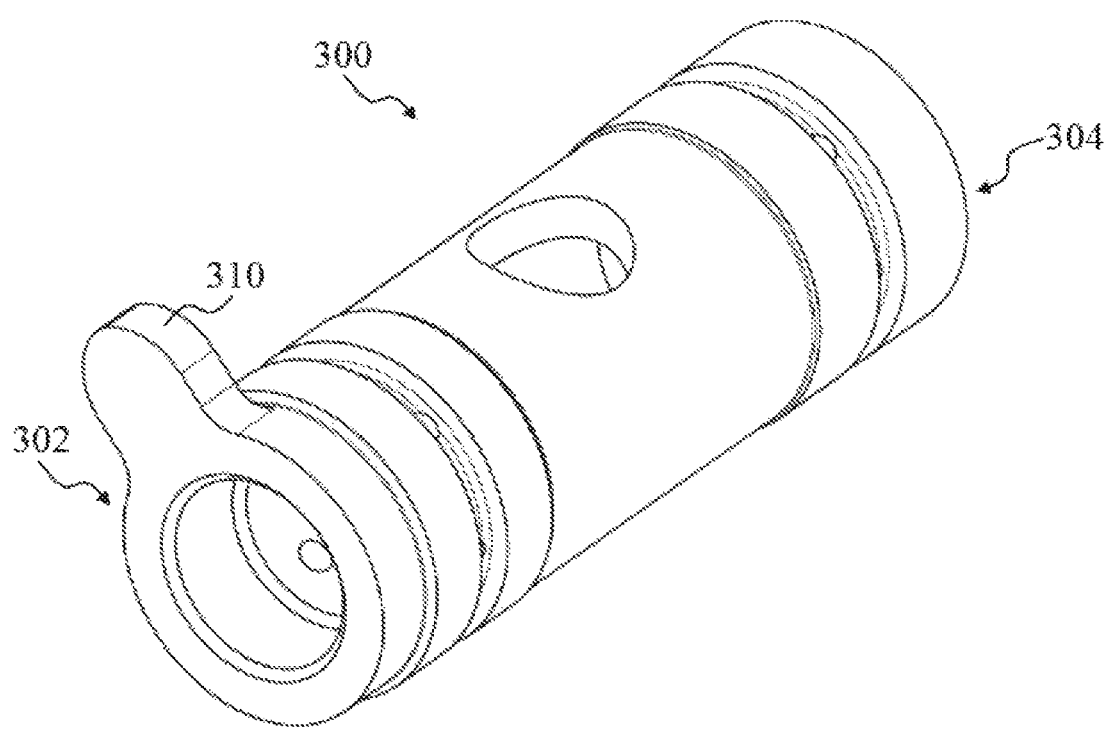
FIG. 3 shows a perspective view of one exemplary embodiment of the bearing bush according to the invention.

FIG. 1 shows a part of a supercharging apparatus 1 having a bearing unit 10 according to the invention. In addition to the bearing unit 10, the supercharging apparatus 1 has a compressor impeller 600 and a turbine wheel 700 which are mounted rotatably on the common turbocharger rotor 200 in the bearing unit 10. Corresponding compressor and turbine housings are omitted in FIG. 1. During operation of the supercharging apparatus 1, the turbine wheel 700 is driven by the exhaust gas stream from the internal combustion engine, as a result of which the compressor impeller 600 is also set in rotation. The compressor impeller 600 in turn compresses the fresh air which is fed to the internal combustion engine for the combustion of the fuel. As has already been mentioned, the bearing unit 10 according to the invention serves for mounting the turbocharger rotor 200, on which the compressor impeller 600 and the turbine wheel 700 are arranged. The bearing unit 10 comprises a bearing housing 100 and a bearing bush 300 which is arranged in a central bore 110 for radially mounting a turbocharger rotor 200 in the bearing housing 100. With reference to FIG. 2 and FIG. 3, the bearing bush 300 has a radially outwardly extending projection 310 in the region of a first axial end 302. The projection 310 is designed to interact with the bearing housing 100 as an anti-rotation safeguard for the bearing bush 300 (see FIG. 4).

The refinement according to the invention of the bearing unit 10 has the advantage that no additional components are required for the anti-rotation safeguard of the bearing bush 300 in the bearing housing 100, but rather only a modification of the existing components, in this case the bearing bush 300, is necessary. By implication, this also means very rapid and simple assembly of the bearing unit 10, since no further components have to be mounted. Since no additional securing elements which usually have to be manufactured with high precision and are therefore expensive to produce have to be produced and assembled, the costs for the production of the bearing unit 10 are also reduced. Although the anti-rotation safeguard is configured integrally with the bearing bush 300, there is no loss of functional faces in the bearing unit 10. Furthermore, the radially extending projection 310 of the bearing bush 300 has the advantage that it serves at the same time as a quality assurance element in accordance with the poka-yoke system, since faulty assembly of the bearing bush 300 is as it were impossible as a result of the asymmetrical configuration. Moreover, the bearing unit 10 according to the invention has a very compact overall design, since no additional space has to be provided for securing elements. Therefore, the axial extent of the bearing unit 10 is shorter relative to the bearing units which are known from the prior art. In the example which is shown in FIG. 1, the first axial end 302 of the bearing bush 300 is the compressor-side end of the bearing bush 300. Moreover, the bearing bush 300 has a second axial end 304 which is the turbine-side end of the bearing bush 300. In theory, the radially extending projection 310 can also be provided at the second axial end 304.

As can be seen in FIG. 3, the projection 310 in the example which is shown is configured as a cam with a rounded end. As viewed in the axial direction, the radial end of the projection preferably has the shape of a semicircle on the outer circumference. The projection can have further rounded shapes, as long as it is ensured that an oil film (see following paragraph) is preserved and is not interrupted. Furthermore, a circumferentially supporting function should be ensured even in the case of a possible running-in process, as a consequence, for example, of a start/stop automatic system and the associated interruption of the oil supply.

Figure 4:
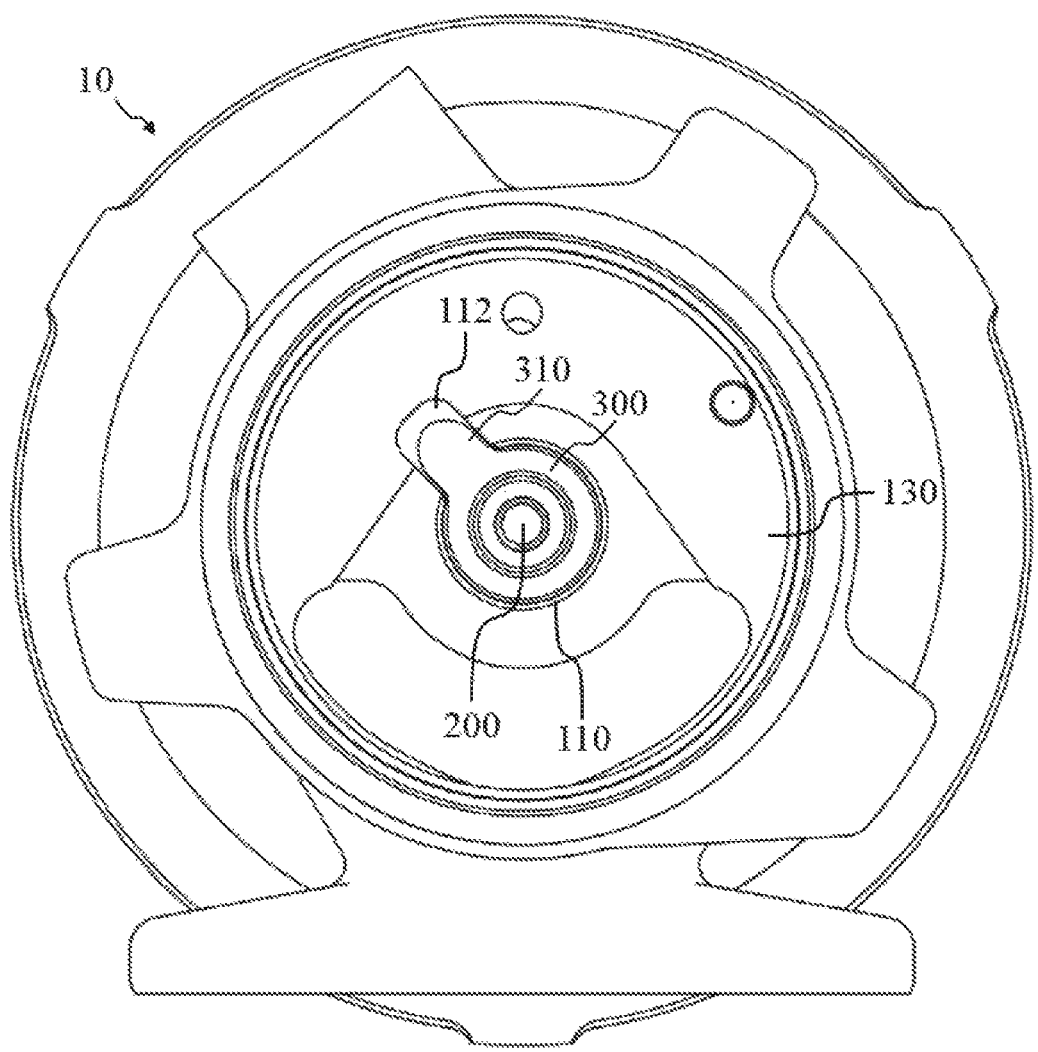
FIG. 4 shows a side view of the bearing unit according to the invention from FIG. 1.

As can be seen clearly in FIG. 2 and in FIG. 4, a cutout 112 is provided in a radial side wall 130 of the bearing housing 100, which cutout 112 interacts with the projection 310, in order to prevent a rotation of the bearing bush 300. Here, the cutout 112 and the projection 310 are adapted to one another in such a way that there is a minimum play between the cutout 112 and the projection 310 in the assembled state of the bearing unit 10, with the result that the rotor dynamic movements of the bearing bush 300 are not impaired in a negative manner. In other words, a minimum rotation of the bearing bush 300 in the bearing housing 100 remains possible. The play between the cutout 112 and the projection 310 makes the configuration of a damping oil film possible between the bearing housing 100 and the projection 310 of the bearing bush 300. The rounded or semicircular configuration of the radial end of the projection 310 and the damping oil film ensure that no mixed friction occurs in said region and the engagement of the projection 310 into the cutout 112 in the bearing housing 100 takes place as it were without wear. The depth of the cutout 112 can correspond to at least half the axial extent of the projection 310. The depth of the cutout 112 can be at least as great as the axial extent of the projection 310. In the example of FIG. 1 and FIG. 2, the depth of the cutout 112 is greater than the axial extent of the projection 310. For example, the depth of the cutout 112 can be from 1.1 to 3 times, in particular from 1.5 to 2.5 times, particularly preferably from 1.8 to 2.2 times greater than the axial extent of the projection 310.

Figure 5:
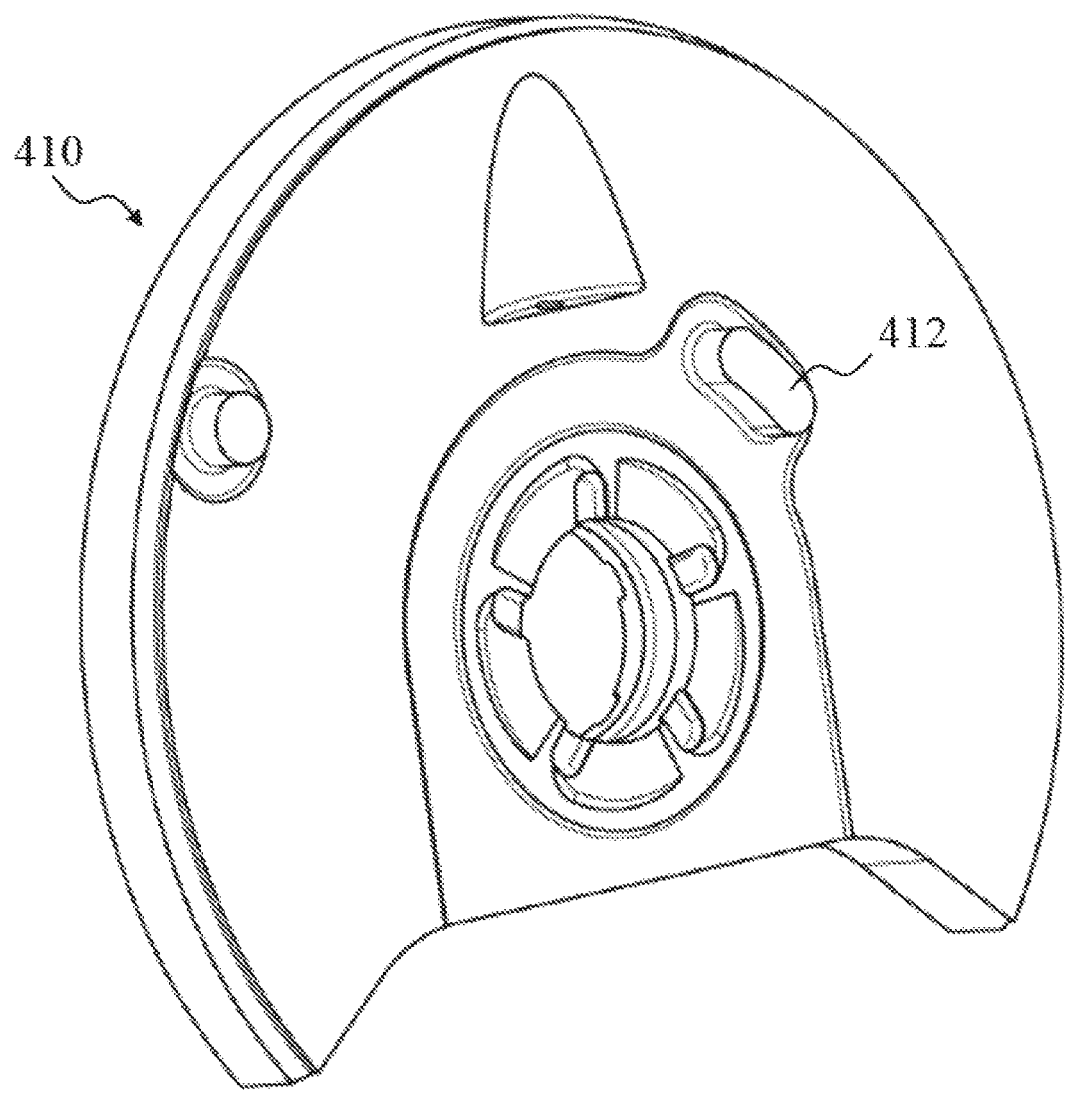
FIG. 5 shows a perspective view of one exemplary embodiment of a torque-proof component of an axial bearing of the bearing unit according to the invention from FIG. 1.

Moreover, the projection 310 serves for axially securing the bearing bush 300. In the example which is shown in FIG. 1 and in FIG. 2, the projection 310 for axially securing the bearing bush 300 interacts with a torque-proof component 410 of an axial bearing 400 of the turbocharger rotor 200. The torque-proof component 410 is shown separately in FIG. 5. An axially extending pin 412 is arranged on the torque-proof component 410 of the axial bearing 400, which pin 412 interacts with the projection 310 for axially securing the bearing bush 300. As an alternative, an axially extending pin can be arranged in the region of a radial end of the projection 310, which pin interacts with the torque-proof component 410 of the axial bearing 400 for axially securing the bearing bush 300. The bearing arrangement 10 according to the invention therefore not only has the advantage that the projection 310 of the bearing bush 300 serves as an anti-rotation safeguard for the bearing bush 300, but rather also that the projection 310 at the same time serves as a means for axially securing the bearing bush 300 in the bearing housing 100. The axially extending pin 412 on the torque-proof component 410 of the axial bearing 400 ensures that a certain spacing in the axial direction is guaranteed between the bearing bush 300 and the rotating components of the axial bearing 400, and no contact occurs between the bearing bush 300 and the rotating components of the axial bearing 400. Here, the dimensioning of the projection 310, the cutout 112 and the pin 412 is to be selected in such a way that there is a minimum axial play between the projection 310, the bearing housing 100 and the torque-proof component 410. Said play in the axial direction ensures that the bearing bush 300 is not impaired in a negative manner in terms of its rotor to dynamic movement.

As an alternative to the torque-proof component 410, the radial projection 310 can also interact with a part of the bearing housing 100, in particular a housing cover 120, for axially securing the bearing bush 300. In this case, the axially extending pin can be arranged on the housing cover 120 or once again in the region of the radial end of the projection 310. With regard to the dimensioning of the projection 310, the cutout 112 and the pin, the same applies as for the exemplary embodiment, in the case of which the radial projection 310 for axially securing the bearing bush 300 interacts with the torque-proof component 410: a minimum axial play between the projection 310, the bearing housing 100 and the housing cover 130 is to be provided, in order not to impair the rotor dynamic movements of the bearing bush 300.

For example, the bearing bush 300 can be machined from solid material. Alternative production methods are also possible, however.

As has already been mentioned at the outset, the invention comprises, moreover, the supercharging apparatus 1 which is designed to provide compressed fresh air to an internal combustion engine. The supercharging apparatus comprises a compressor with a compressor housing (not shown in the figures) and a compressor impeller 600 which is arranged therein, and a bearing unit 10 according to any one of the exemplary embodiments which have been described in the preceding text.

As shown in FIG. 1, the supercharging apparatus 1 can be, in particular, an exhaust gas turbocharger and, moreover, can comprise a turbine with a turbine housing (not shown in the figures) and a turbine wheel 700 which is arranged therein.

The invention claimed is:

1. A bearing unit (10) for a turbocharger rotor (200) comprising:
   a bearing housing (100); and
   a bearing bush (300) which is arranged in a central bore (110) for radially mounting a turbocharger rotor (200) in the bearing housing (100);
   wherein, in a region of a first axial end (22), the bearing bush (300) has a radially outwardly extending projection (310) which is configured integrally with the bearing bush (300) and which is designed to interact with the bearing housing (100) as an anti-rotation safeguard for the bearing bush (300).

2. The bearing unit as claimed in claim 1, wherein the projection (310) is configured as a cam.

3. The bearing unit as claimed in claim 1, wherein a cutout (112) is provided in a radial side wall (130) of the bearing housing (100), which cutout (112) interacts with the projection (310), in order to prevent a rotation of the bearing bush (300).

4. The bearing unit as claimed in claim 3, wherein a depth of the cutout (112) corresponds to at least half an axial extent of the projection (310).

5. The bearing unit as claimed in claim 3, wherein a depth of the cutout (112) is at least as great as an axial extent of the projection (310).

6. The bearing unit as claimed in claim 3, wherein a depth of the cutout (112) is greater than an axial extent of the projection (310).

7. The bearing unit as claimed in claim 6, wherein the depth of the cutout (112) is from 1.1 to 3 times greater than the axial extent of the projection (310).

8. The bearing unit as claimed in claim 6, wherein the depth of the cutout (112) is from 1.5 to 2.5 times greater than the axial extent of the projection (310).

9. The bearing unit as claimed in claim 1, wherein the projection (310) serves for axially securing the bearing bush (300).

10. The bearing unit as claimed in claim 9, wherein the projection (310) for axially securing the bearing bush (300) interacts with a housing cover (120) or a torque-proof component (410) of an axial bearing (400) of the turbocharger rotor (200).

11. The bearing unit as claimed in claim 10, wherein an axially extending pin (412) is arranged on the housing cover (120) or the torque-proof component (410) of the axial bearing (400), which pin (412) interacts with the projection (310) for axially securing the bearing bush (300).

12. The bearing unit as claimed in claim 10, wherein an axially extending pin is arranged in a region of a radial end of the projection (310), which pin interacts with the housing cover (120) or the torque-proof component (410) of the axial bearing (400) for axially securing the bearing bush (300).

13. The bearing unit as claimed in claim 1, wherein the bearing bush (300) is machined from solid material.

14. A supercharging apparatus (100) for an internal combustion engine comprising: a compressor with a compressor housing and a compressor impeller (600) which is arranged therein; and
   a bearing unit (10) as claimed in claim 1.

15. The supercharging apparatus as claimed in claim 14, wherein the supercharging apparatus is an exhaust gas turbocharger and comprises a turbine with a turbine housing and a turbine wheel (700) which is arranged therein.

\* \* \* \* \*